US008351993B2

(12) United States Patent
Nunes

(10) Patent No.: US 8,351,993 B2
(45) Date of Patent: Jan. 8, 2013

(54) DEVICE HAVING SIDE SENSOR

(75) Inventor: Trevor Lawrence Nunes, Kanata (CA)

(73) Assignee: Research In Motion Limited, Waterloo (CA)

( * ) Notice: Subject to any disclaimer, the term of this patent is extended or adjusted under 35 U.S.C. 154(b) by 78 days.

(21) Appl. No.: 12/900,893

(22) Filed: Oct. 8, 2010

(65) Prior Publication Data

US 2012/0088553 A1  Apr. 12, 2012

(51) Int. Cl.
G06F 3/045 (2006.01)
H04W 88/02 (2009.01)
G06F 3/041 (2006.01)

(52) U.S. Cl. .................. 455/566; 345/169; 345/173

(58) Field of Classification Search .............. 455/550.1, 455/556, 566, 575; 345/156–184
See application file for complete search history.

(56) References Cited

U.S. PATENT DOCUMENTS

| 7,656,393 B2* | 2/2010 | King et al. ............... 345/173 |
| 2002/0158838 A1* | 10/2002 | Smith et al. ............... 345/156 |
| 2003/0122779 A1* | 7/2003 | Martin et al. ............... 345/156 |
| 2004/0203520 A1* | 10/2004 | Schirtzinger et al. ........ 455/90.3 |
| 2010/0013775 A1 | 1/2010 | Son |
| 2010/0052880 A1* | 3/2010 | Laitinen et al. ............ 340/407.2 |

FOREIGN PATENT DOCUMENTS

| DE | 10122319 A1 | 11/2002 |
| WO | 2008006068 A2 | 1/2008 |
| WO | 2008075996 A1 | 6/2008 |

OTHER PUBLICATIONS

New Squeezable User-InterfaceTechnology in Suma, http://www.garneguru.in/hardware/2009/03/new-squeezable-user-interface-technology-in-surna/, Dec. 3, 2009.
http://www.medien.ifi.lmu.de/publications/pub/wimmer2009handSense/wimmer2009handSense.pdf, Feb. 18, 2009.
Office Action from corresponding European Patent Application No. 10187021.0; mailed Dec. 6, 2011; 8 pages.
Slashgear, (Dec. 14, 2009) Synaptics Fuse concept packs smartphone with squeeze, stroke & scroll sensors [Video], <http://www.slashgear.com/synaptics-ftise-concept-packs-smartphone-with-squeeze-stroke-scroll-sensors-video-1465938/>, (accessed Aug. 20, 2010).
Wikipedia, (2010), Chumby, <http://en.wikipedia.org/wiki/Chumby> (accessed Aug. 20, 2010).
Gameguru, (Dec. 3, 2009) New Squeezable User-InterfaceTechnology in Suma, <http://www.gameguru.in/hardware/2009/03/new-squeezable-user-interface-technology-in-surna/> (accessed Aug. 20, 2010).
Wimmer et al., (Feb. 16-18, 2009) "HandSense—Discriminating Different Ways of Grasping and Holding a Tangible User Interface", (Continued)

Primary Examiner — Kamran Afshar
Assistant Examiner — Kashif Siddiqui
(74) Attorney, Agent, or Firm — Ridout & Maybee LLP

(57) ABSTRACT

A method of input and device are provided. The device includes a housing having a front face exposing a display, a back face opposing the front face, and a plurality of sides. The sides include a first side and a second side. The device includes a controller and a first sensing layer located within the housing along the first side. The first sensing layer includes a first position sensing layer extending longitudinally along the first side. The first position sensing layer is coupled to the controller to provide position input. The first sensing layer also includes a first pressure sensing layer. The first pressure sensing layer is coupled to the controller to provide pressure input.

17 Claims, 9 Drawing Sheets

OTHER PUBLICATIONS

TEI 2009 <http://www.medien.ifi.lmu.de/pubdb/publications/pub/wimmer2009handSense/wimmer2009handSense.pdf> (accessed Aug. 20, 2010).

SpringerLink, Touch Detection System for Mobile Terminals <http://www.springerlink.com/content/w51e00xbluk29npa/> (accessed Aug. 20, 2010).

Mantyjarvi et al. (2004), "Touch Detection System for Mobile Terminals", MobileHCI 2004, LNCS 3160, pp. 331-336 <http://resources.metapress.com/pdf-preview.axd?code=w51e00xb1uk29npa& size=largest> (accessed May 17, 2012).

\* cited by examiner

DEVICE HAVING SIDE SENSOR

TECHNICAL FIELD

The present disclosure relates to portable electronic devices and, more particularly, to input mechanisms for electronic devices.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth™ capabilities.

Portable electronic devices such as PDAs or smart telephones are generally intended for handheld use and ease of portability. Smaller devices are generally desirable for portability. Portable electronic devices frequently include one or more input mechanisms such as, for example, a touch-screen or a physical keyboard. Each of these input mechanisms offers its own set of advantages, but also has its own set of drawbacks. For example, touchscreen displays permit a larger portion of a device's surface to be occupied by a display. However, touchscreen displays may become dirty more easily than traditional displays, since, when a user interacts with a touchscreen display, they may leave behind fingerprints, together with residue such as oil, etc.

DETAILED DESCRIPTION OF EXAMPLE EMBODIMENTS

Figure 1:
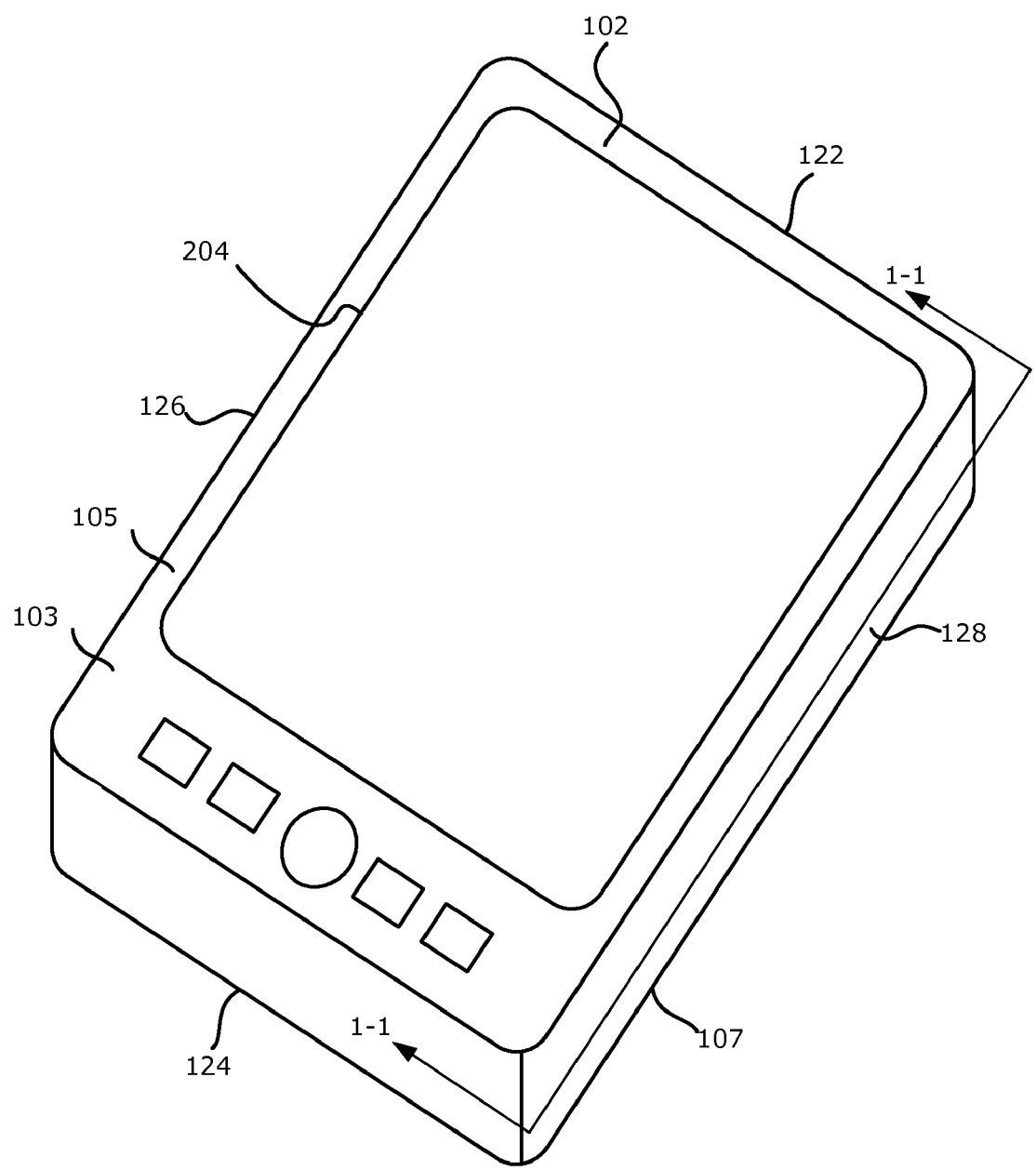
FIG. 1 is perspective view of an electronic device in accordance with an example embodiment of the present disclosure.

In accordance with an embodiment of the present disclosure, there is provided a mobile device. The mobile device includes a housing having a front face exposing a display, a back face opposing the front face, and a plurality of sides connecting the back face to the front face. The plurality of sides includes at least a first side and a second side. The mobile device includes a controller located within the housing and a first sensing layer located within the housing along the first side. The first sensing layer includes a first position sensing layer extending longitudinally along the first side and coupled to the controller to provide position input to the controller. The first sensing layer also includes a first pressure sensing layer that is coupled to the controller to provide pressure input to the controller. The first side is constructed of a semi-rigid material to permit the first side to be movable between a rest position and an actuating position. The first side applies greater force to the first pressure sensing layer in the actuating position than in the rest position.

In accordance with a further embodiment of the present disclosure, there is provided a method of receiving an input command at a mobile device. The method comprises: monitoring for pressure input received from a first pressure sensing layer and a second pressure sensing layer associated with the mobile device, the first pressure sensing layer being located within a housing of the mobile device along a first side of the mobile device to detect pressure applied to the first side of the mobile device and the second pressure sensing layer being located within the housing along a second side of the mobile device to detect pressure applied to the second side of the mobile device; determining, from the pressure input, whether both of the first pressure sensing layer and the second pressure sensing layer are simultaneously activated; and in response to determining that the first pressure sensing layer and the second pressure sensing layer are simultaneously activated, performing a predetermined action.

In accordance with yet a further embodiment of the present disclosure, there is provided a method of receiving an input command at a mobile device. The method comprises: monitoring for pressure input received from a first pressure sensing layer, the first pressure sensing layer being located within a housing of the mobile device along a first side of the mobile device to detect pressure applied to the first side of the mobile device; determining whether the pressure input is within a first range; determining whether the pressure input is within a second range; perform a first predetermined action if the pressure input is within the first range; and performing a second predetermined action if the pressure input is within the second range.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, notebook computers, tablet or slate computers, and so forth. The portable electronic device may also be a portable electronic device without wireless communication capabilities, such as a handheld electronic game device, digital photograph album, digital camera, or other device. The portable electronic device may, in at least some embodiments, be referred to as a mobile device.

Figure 2:
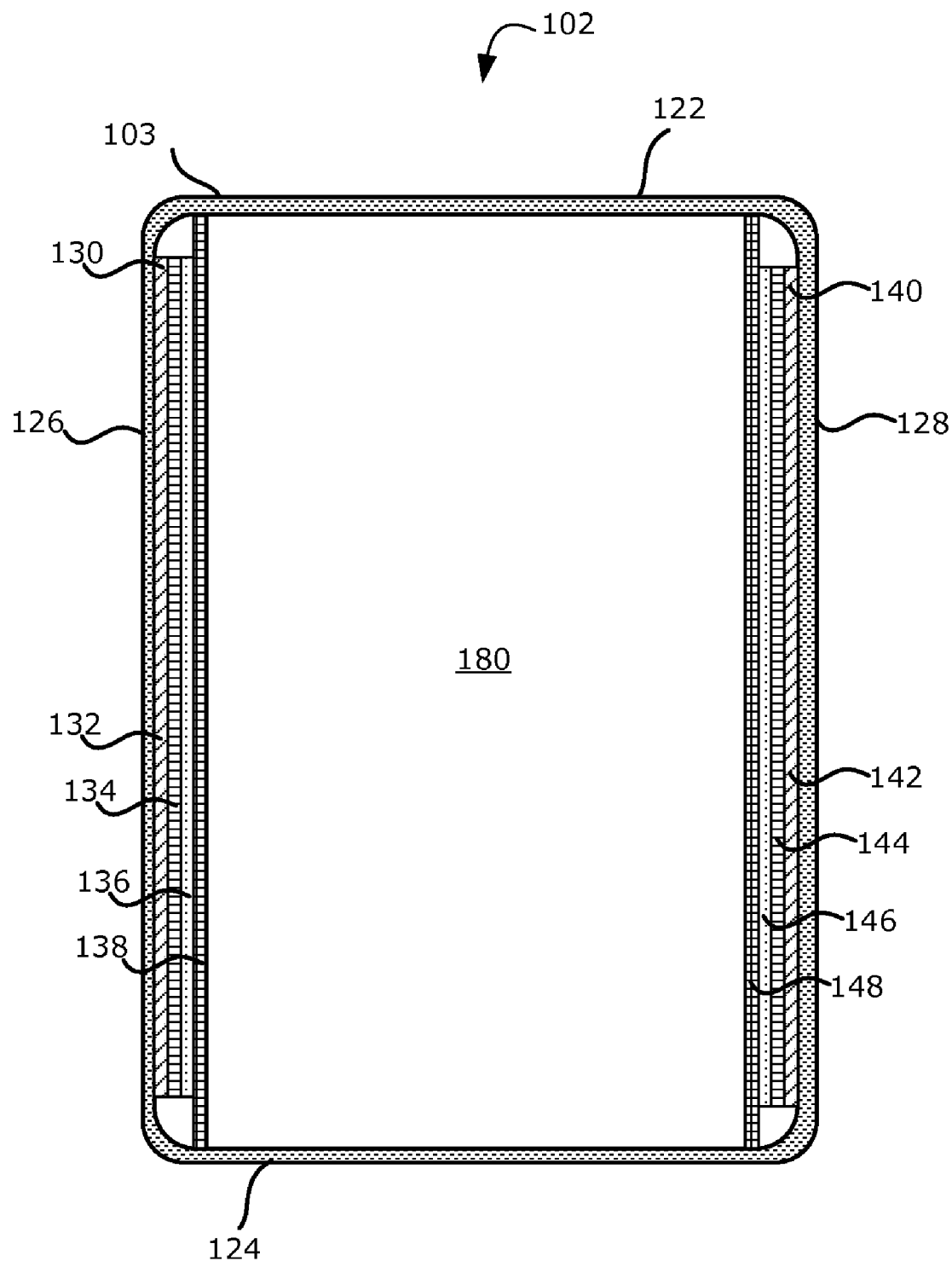
FIG. 2 is a cross sectional view of an example embodiment of an electronic device taken along line 1-1 of FIG. 1.

Reference is first made to FIGS. 1 and 2 which illustrate an example electronic device 102 in which embodiments of the present disclosure may be applied.

The electronic device 102 includes a housing 103 for enclosing many of the components of the electronic device 102. The housing 103 may also be referred to as a case.

The housing 103 is configured to be held in a user's hand while the electronic device 102 is in use. In the embodiment shown in FIG. 1, the housing 103 is elongate having a length greater than its width. The housing 103 has a front face 105 which exposes a display 204. The housing 103 has a back face 107 which opposes the front face. In the embodiment shown, the front face 105 defines a plane which is substantially parallel to a plane defined by the back face 107.

The housing 103 has four sides 122, 124, 126, 128 which connect the back face 107 to the front face 105. The sides include opposed top and bottom sides which are designated by references 122, 124 respectively, and left and right sides extending transverse to the top and bottom sides 122, 124, designated by references 126, 128 respectively. In the embodiment shown, the housing 103 is substantially shaped as a rectangular prism formed by the front face 105, back face 107, and sides 122, 124, 126, 128. Any one of the sides 122, 124, 126, 128 may, in various embodiments, be referred to as a first side, a second side, a third side or a fourth side.

It will be appreciated that, in other embodiments, the housing may have other form factors.

Referring now to FIG. 2, a cross sectional view of the electronic device 102 taken along the line 1-1 of FIG. 1 is illustrated. The cross sectional view illustrates a first sensing layer 130 which is located within the housing 103 along a first side of the device 102. In the embodiment illustrated, the first side is the left side 126.

The first sensing layer 130 includes a first position sensing layer 134 and a first pressure sensing layer 136. The first position sensing layer 134 is, in at least some embodiments, a capacitive sensor. A capacitive sensor is a sensor which is capable of detecting position based on capacitive coupling effects.

In other embodiments, the first position sensing layer 134 is a resistive sensor. A resistive sensor is a sensor which determines position based on resistance principles.

The first position sensing layer 134 extends longitudinally along the first side. That is, the first position sensing layer 134 has a sensing side which extends along at least a portion of the length of the first side. In some embodiments, the first position sensing layer 134 may extend along the complete length of the first side. In other embodiments, the first position sensing layer 134 may extend only along a portion of the first side. In at least some embodiments, the first position sensing layer 134 extends along at least half of the length of the first side. In at least some embodiments, the first position sensing layer 134 extends along at least two-thirds of the length of the first side.

A user may interact with the device 102 by touching the first side of the device 102. The first position sensing layer 134 is able to detect the position at which a touch was applied. The length of the first position sensing layer 134 determines the portion of the first side where a touch can be sensed.

Figure 4:
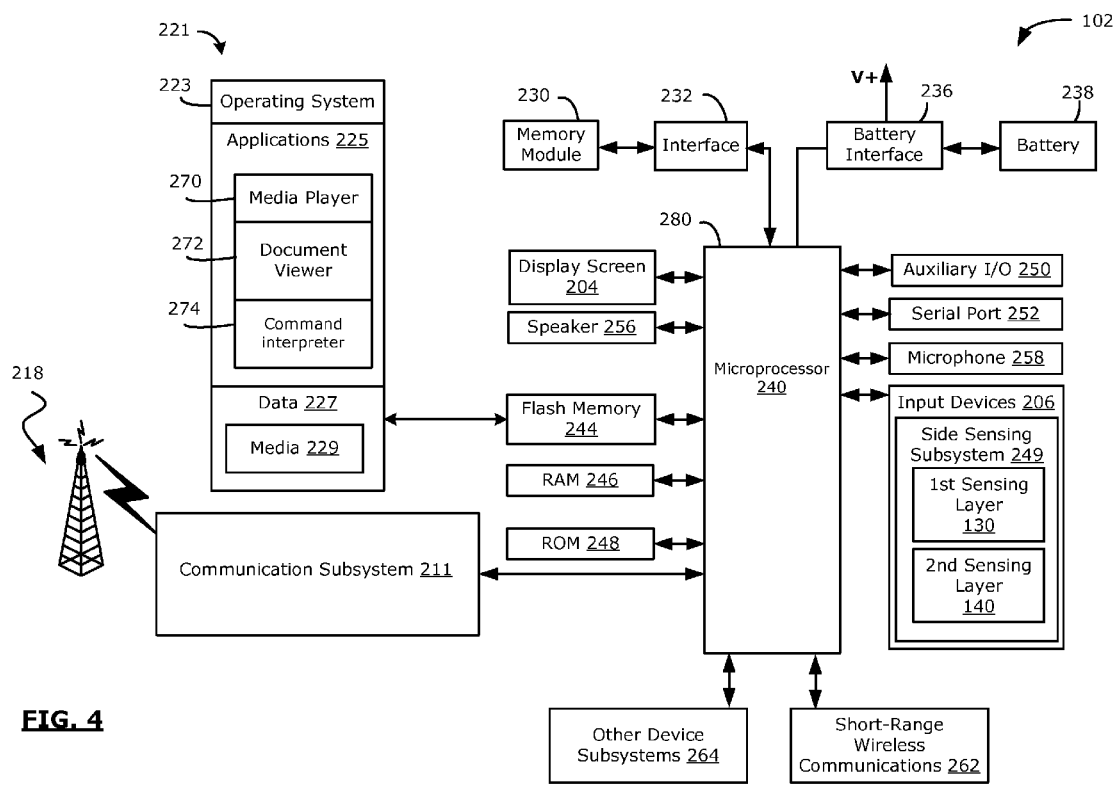
FIG. 4 is a block diagram of an electronic device in accordance with an example embodiment of the present disclosure.

The first position sensing layer 134 provides a position input to a controller 280 (FIG. 4) associated with the device 102, such as a microprocessor 240, which is illustrated in FIG. 4. The position input identifies a location of any touch contact made along the portion of the first side which is adjacent to the position sensing layer 134. That is, the first position sensing layer 134 provides position input which identifies a location of any portion of the first sensing layer 130 which is engaged by direct or indirect contact.

In some embodiments, the first sensing layer 130 may include a first conductive layer 132 which is located between the first side 126 and the first position sensing layer 134. The first conductive layer 132 is comprised of a conductive material which facilitates touch detection at the first position sensing layer 134. The first conductive layer 132 may, in at least some embodiments, be a silver doped substrate.

The first sensing layer 130 also includes a first pressure sensing layer 136. In the embodiment illustrated, the first pressure sensing layer 136 is coupled to a controller 280. The first pressure sensing layer 136 provides a pressure input to the controller 280. A user may interact with the device 102 by applying pressure to the first side of the device 102. Such an interaction may be detected by the first pressure sensing layer 136. More particularly, applying such a pressure to the first side of the device causes the first side to move from a rest position (which is the un-bended position illustrated in FIG. 2) to an actuating position.

In the actuating position, the first side 126 bends slightly in order to apply greater force to the pressure sensing layer than the first side applies when it is in the rest position.

In order to permit the first side 126 to bend, the first side may be constructed of a semi-rigid material, such as a semi-rigid plastic. That is, the first side 126 may flex when pressure is applied to the first side. In at least some embodiments, the first side is, in a rest position, substantially flat. When pressure is applied to the first side 126, the first side may deform so that it becomes arched or angled along its length.

In at least some embodiments, the first side 126 is constructed of a material which is not compressible. That is, the first side 126 is constructed of a material which cannot be made more compact (or which can not easily be made more compact) by applying pressure to the first side 126. That is, the first side 126 is constructed of a material which occupies the same volume, or substantially the same volume, when a force is applied to that material which it occupies when a force is not applied to that material. For example, rubber is an example of a material which may be considered to be a compressible material. A rigid or semi-rigid plastic is an example of a material which may be considered to be an un-compressible material.

In at least some embodiments, the first pressure sensing layer 136 is located very close to the first side 126 and the degree of bending which is required to engage the pressure sensing layer 136 is negligible. In at least some embodiments, the degree of bending required to enter the actuating position is visually imperceptible to the user.

In at least some embodiments, in order to ensure that any touch contact is received by the first position sensing layer 134, the first position sensing layer 134 is located between the first side 126 and the first pressure sensing layer 136.

The first pressure sensing layer 136 is a force sensor which measures a force applied to an active surface of the first pressure sensing layer 136. The active surface of the first pressure sensing layer 136 is the surface which is nearest the first side of the housing.

To prevent the first pressure sensing layer 136 from receding deeper within the housing when a force is applied to the first side 126 of the device, the first pressure sensing layer 136 is held in place by a first pressure sensing layer support 138. The first pressure sensing layer support 138 is, in the embodiment illustrated, a rigid wall which acts as a back stop for the first pressure sensing layer 136. However, in other embodiments, the first pressure sensing layer 136 may be supported by other components 180 of the device, which may be rigidly secured within the device 102 in order to provide a stable support to the first pressure sensing layer 136.

In at least some embodiments, in order to secure the first sensing layer 130 from accidental damage from fluids, the first sensing layer 130 and/or the first position sensing layer 134 and/or the first pressure sensing layer 136 may be enclosed in a waterproof or water-resistant film (not shown). The film may be a thin coating or layer that surrounds or substantially surrounds the layer.

In at least some embodiments, the first position sensing layer 134 may be bonded to the first pressure sensing layer 136.

In at least some embodiments, such as the embodiment of FIG. 2, the device 102 may include a second sensing layer 140. The second sensing layer 140 is located within the housing 103 along a second side of the device 102. In the embodiment illustrated, the second side is the right side 128.

The second sensing layer 140 includes a second position sensing layer 144 and a second pressure sensing layer 146. The second position sensing layer 144 is, in at least some embodiments, a capacitive sensor. A capacitive sensor is a sensor which is capable of detecting position based on capacitive coupling effects.

In other embodiments, the second position sensing layer 144 is a resistive sensor. A resistive sensor is a sensor which determines position based on a resistance principles.

The second position sensing layer 144 extends longitudinally along the second side 128. That is, the second position sensing layer 144 has a sensing side which extends along at least a portion of the length of the second side. In some embodiments, the second positioning sensing layer 144 may extend along the complete length of the second side 128. In other embodiments, the second position sensing layer 144 may extend only along a portion of the second side 128. In at least some embodiments, the second position sensing layer 144 extends along at least half of the length of the second side 128. In at least some embodiments, the second position sensing layer 144 extends along at least two-thirds of the length of the second side.

A user may interact with the device 102 by touching the second side 128 of the device 102. The second position sensing layer 144 is able to detect the position at which a touch was applied. The length of the second position sensing layer 144 determines the portion of the second side 128 where a touch can be sensed.

The second position sensing layer 144 provides a position input to a controller 280 associated with the device 102. The position input identifies a location of any touch contact made along the portion of the second side 128 which is adjacent to the second position sensing layer 144. That is, the second position sensing layer 144 provides position input which identifies a location of any portion of the second sensing layer 140 which is engaged by direct or indirect contact.

In some embodiments, the second sensing layer 140 may include a second conductive layer 142 which is located between the second side 128 and the second position sensing layer 144. The second conductive layer 142 is comprised of a conductive material which facilitates touch detection at the second position sensing layer 144. The second conductive layer 142 may, in at least some embodiments, be a silver doped substrate.

The second sensing layer 140 also includes a second pressure sensing layer 146. In the embodiment illustrated, the second pressure sensing layer 146 is coupled to a controller 280. The second pressure sensing layer 146 provides a pressure input to the controller 280. A user may interact with the device 102 by applying pressure to the second side 128 of the device 102. Such an interaction may be detected by the second pressure sensing layer 146. More particularly, applying such a pressure to the second side 128 of the device causes the second side to move from a rest position (which is the un-bended position illustrated in FIG. 2) to an actuating position.

In the actuating position, the second side 128 bends slightly in order to apply greater force to the second pressure sensing layer 146 than the second side applies when it is in the rest position.

In order to permit the second side 128 to bend, the second side may be constructed of a semi-rigid material, such as a semi-rigid plastic. That is, the second side 128 may flex when pressure is applied to the second side. In at least some embodiments, the second side is, in a rest position, substantially flat. When pressure is applied to the second side 128, the second side 128 may deform so that it becomes arched or angled along its length.

In at least some embodiments, the second side 128 is constructed of a material which is not compressible. That is, the second side 128 is constructed of a material which cannot be made more compact (or which can not easily be made more compact) by applying pressure to the second side 128. That is, the second side 128 is constructed of a material which occupies the same volume, or substantially the same volume, when a force is applied to that material which it occupies when a force is not applied to that material. For example, rubber is an example of a material which may be considered to be a compressible material. A rigid or semi-rigid plastic is an example of a material which may be considered to be an un-compressible material.

In at least some embodiments, the second pressure sensing layer 146 is located very close to the second side 128 and the degree of bending which is required to engage the second pressure sensing layer is negligible. In at least some embodiments, the degree of bending required to enter the actuating position is visually imperceptible to the user.

In at least some embodiments, in order to ensure that any touch contact is received by the second position sensing layer 144, the second position sensing layer 144 is located between the second side 128 and the second pressure sensing layer 146.

The second pressure sensing layer 146 is a force sensor which measures a force applied to an active surface of the second pressure sensing layer 146. The active surface of the second pressure sensing layer 146 is the surface which is nearest the first side of the housing.

To prevent the second pressure sensing layer 146 from receding deeper within the housing when a force is applied to the second side of the device, the second pressure sensing layer 146 is held in place by a second pressure sensing layer support 148. The second pressure sensing layer support 148 is, in the embodiment illustrated, a rigid wall which acts as a back stop for the second pressure sensing layer 146. However, in other embodiments, the second pressure sensing layer 146 may be supported by other components 180 of the device, which may be rigidly secured within the device 102 in order to provide a stable support to the second pressure sensing layer 146.

In at least some embodiments, in order to secure the second sensing layer 140 from accidental damage from fluids, the second sensing layer 140 and/or the second position sensing layer 144 and/or the second pressure sensing layer 146 may be enclosed in a waterproof or water-resistant film (not shown). The film may be a thin coating or layer that surrounds or substantially surrounds the layer.

In at least some embodiments, the second position sensing layer 144 may be bonded to the second pressure sensing layer 146.

The first side 126 and the second side 128 each have an internal surface which is nearest the first and second sensing layers 130, 140, and an external surface which opposes the internal surface. The external surface is the surface which is exposed by the device 102 and which with a user may interact. In at least some embodiments, the external surface of the first side 126 and/or the external surface of the second side 128 are level across the length of the device 102. That is, it at least some embodiments, the external surface of the first side 126 and/or the external surface of the second side 128 may not have any protrusions. The use of such a level surface reduces the collection of dust and debris along the device 102.

The first sensing layer 130 located along the left or first side 126 of the device 102 and the second sensing layer 140 located along the right or second side 128 of the device may be used, in at least some embodiments, to detect if the device 102 is squeezed by a user. In at least some embodiments, a controller 280 may be configured to interpret such a squeezing action as a command to execute a predetermined function.

In some embodiments, the first sensing layer 130 and/or the second sensing layer 140 may be used to provide input controls for the device 102. In at least some embodiments, the position input and the pressure input may be collectively used to determine the location where a force was applied. Different locations may be associated with different input commands.

It will be appreciated that, in many embodiments, any one or combination of the layers of FIG. 2 may be made to be thinner than they appear in the illustration of FIG. 2. The width of the layers in FIG. 2 is exaggerated in order to better illustrate the embodiment.

The housing 103 also houses other components 180. To better illustrate the sensing layers 130, 140, the other components 180 have not been illustrated in FIG. 2. However, it will be appreciated that many of the components discussed below with respect to FIG. 4 are also contained within the housing 103. For example, one or more controllers 280 may be located within the housing 103.

Figure 3:
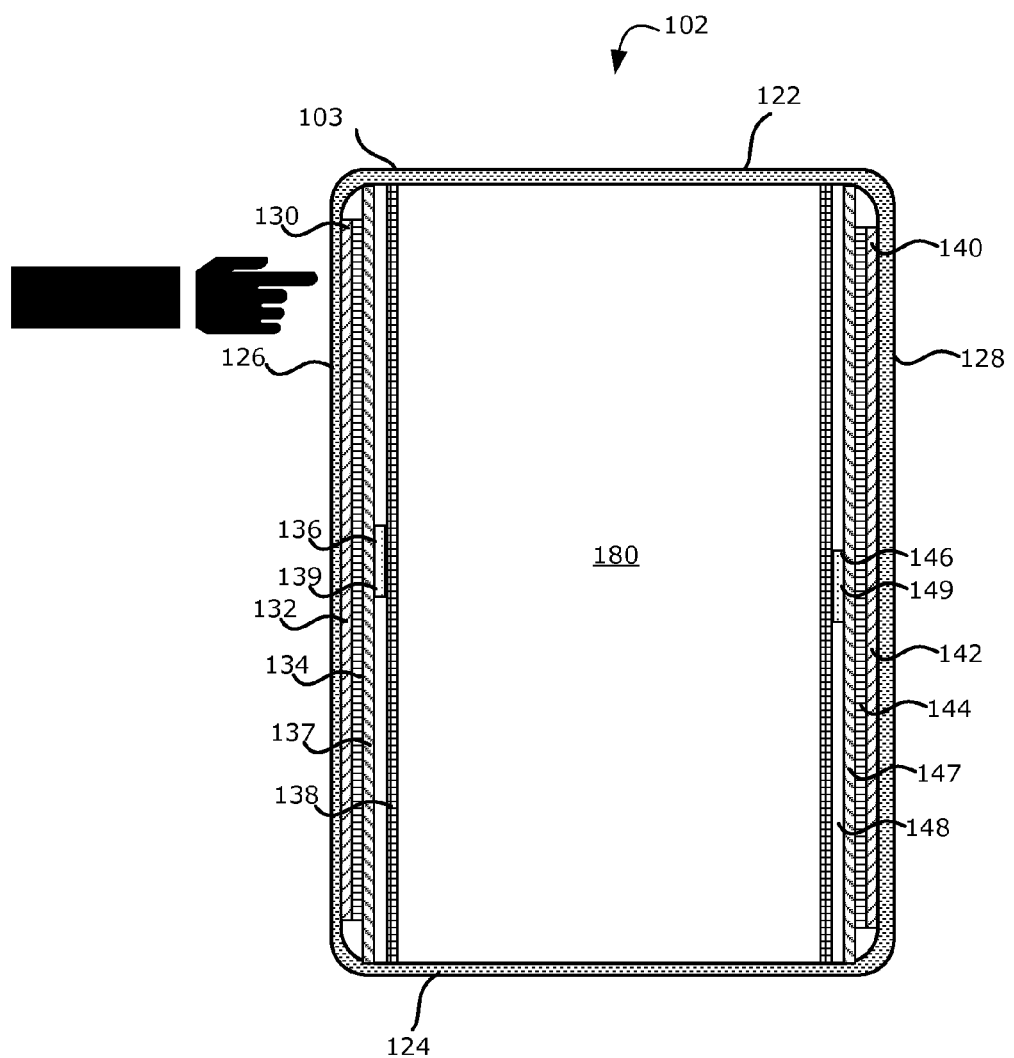
FIG. 3 is a cross sectional view of an example embodiment of an electronic device taken along line 1-1 of FIG. 1.

In the embodiment of FIG. 2, the first pressure sensing layer 136 and the second pressure sensing layer 146 have been illustrated as being formed as a strip sensor. However, in other embodiments, the first pressure sensing layer 136 and/or the second pressure sensing layer 146 may, instead, be comprised of a point pressure sensor. One such embodiment is illustrated in FIG. 3.

The first and second point pressure sensors 139, 149 are pressure sensors which have a small sensing area relative to the sensing area of the corresponding position sensing layers 134, 144. That is, the sensing area of the point pressure sensor is smaller than the sensing area of the position sensing layer.

In at least some embodiments, in order to expand the sensing area which the point pressure sensor 139 or 149 is configured to detect, the pressure sensing layers 136, 146, include an elongate semi-rigid pressure distribution strip 137, 147. The pressure distribution strip 137, 147 is disposed between the point pressure sensor 139, 149 and its respective side (i.e. there may be a first pressure distribution strip 137 disposed between the first side 126 and the first point pressure sensor 139 and there may be a second pressure distribution strip 147 disposed between the second side 128 and the second point pressure sensor 149).

In at least some embodiments, the length of the first and second pressure distribution strips 137, 147 corresponds to the length of the corresponding first and second position sensing layers 134, 144. In at least some embodiments (such as the embodiment illustrated in FIG. 3), the length of the first and second pressure distribution strips 137, 147 correspond to the length of the device 102. The first and second pressure distribution strips 137, 147 may be fixed to the housing 103 at its ends.

The first and second point pressure sensors 139, 149 are, in at least some embodiments, located at or near the midpoint of the corresponding first and second pressure distribution strips 137, 147 along its length. It will be appreciated that a user may press on one of the sides 126, 128, at a position which is away from the corresponding first and second point pressure sensors 139, 149. For example, in the embodiment of FIG. 3, a user may press on the first side 126 at the location indicated by the hand (Note that the size of the hand is not to scale relative to the device 102). When this happens, the first side 126 may apply pressure to the first pressure distribution strip 137 which may, as a result, apply pressure to the first point pressure sensor 139.

Referring now to FIG. 4, a block diagram of an example electronic device 102 is illustrated. In this example embodiment, the electronic device 102 is a handheld electronic device 102 having two-way communication capabilities such as, for example, data communication capabilities, voice communication capabilities or the capability to communicate with other computer systems, for example, via the Internet. The handheld electronic device 102 is sometimes referred to as a mobile communication device or a mobile device.

The handheld electronic device 102 includes one or more controller 280 comprising at least one microprocessor 240 which controls the overall operation of the handheld electronic device 102. The microprocessor 240 interacts with device subsystems including a display screen 204 such as a liquid crystal display (LCD), one or more input devices 206, a wireless communication subsystem 211 which performs communication functions and exchanges radio frequency signals with a wireless network 218, flash memory 244, random access memory (RAM) 246, read only memory (ROM) 248, auxiliary input/output (I/O) subsystems 250, data port 252 such as serial data port such as a Universal Serial Bus (USB) data port, speaker 256, microphone 258, short-range communication subsystem 262, and other device subsystems generally designated as 264. Some of the subsystems shown in FIG. 4 perform communication-related functions, whereas other subsystems may provide "resident" or on-device functions. It will be appreciated that other device configurations are also possible and that not all electronic devices to which methods according to the present application may be applied will have all of the elements described above.

The input devices 206 may take a variety of forms. For example, in some embodiments, the input devices 206 may comprise any combination of a keyboard, control buttons and a navigation device such as a rotatable and depressible ("clickable") thumbwheel or scroll wheel, a depressible ("clickable") rolling member or trackball, or a depressible ("clickable") optical trackpad. In some embodiments, the display screen 204 may be a touchscreen display which also acts both as a display device and an input device 206. The touchscreen display may be constructed using a touch-sensitive input surface connected to an electronic controller and which overlays the display screen 204. The touch-sensitive overlay and the electronic controller provide a touch-sensitive input device and the microprocessor 240 interacts with the touch-sensitive overlay via the electronic controller.

The input device 206 also includes a side sensing subsystem 249. The side sensing subsystem 249 includes the first sensing layer 130. The side sensing subsystem 249 may, in some embodiments, also include the second sensing layer 140.

The side sensing subsystem 249 may include a secondary controller which may be configured to perform at least some of the functions which will be discussed below with reference to a command interpreter 274. That is, while the embodiment of FIG. 4 illustrates only one controller (i.e. the microprocessor 240), it will be appreciated that the device 102 may include multiple controllers and that the functions described below with reference to the microprocessor 240 may be split among multiple processors and/or controllers.

The side sensing subsystem 249 provides an electrical signal (which may include a position input and/or a pressure input) which indicates whether a side (i.e., the first or second sides 126, 128) has been engaged (which may be determined from the first or second pressure sensing layers 136, 146) and the location that the side has been engaged (which may be determined from the first or second position sensing layers 134, 144). As explained more fully below, the microprocessor 240 under the instruction of the command interpreter 274, operating system 223 and/or an application 225 on the device 102 may interpret the position input and pressure input as a command/instruction.

The handheld electronic device 102 may provide a graphical user interface (GUI) on the display screen 204 for controlling the operation of the device 102. The GUI may allow operational aspects of the command interpreter 274 to be defined or set by the device user. As per typical GUIs, the device user may cause a menu to be displayed on the display screen 204 having a number of menu items which can be selected. The microprocessor 240 operates under stored program control and executes software modules 221 stored in memory such as persistent memory, for example, in the flash memory 244. As illustrated in FIG. 4, the software modules 221 comprise operating system software 223 and software applications 225. The software applications 225 may, in some embodiments, include a media player 270 for media 229 playback through the display screen 204 and/or speaker 256. When the media player is active, the mobile device 102 may be said to be operating in a media control mode and, in at least some embodiments, inputs received from the side sensing subsystem may be interpreted as media control commands. Such commands may include, for example, a command to initiate a PLAY function, which initiates playback of media. Such commands may also include a STOP function, which stops the playback of media. Other media control commands may include, for example, commands to pause media playback, commands to fast forward, or rewind, etc.

In at least some embodiments, the software applications 225 may include a document viewer 272. The document viewer 272 may, in various embodiments, take a number of different forms. In some embodiments, the document viewer may be an email message application which allows email messages to be viewed. In other embodiments, the document viewer may be an internet browser application which allows web pages to be viewed. Other document viewing applications are also possible.

The software applications 225 also include the command interpreter 274 for determining an input or command associated with an interaction with the side sensing subsystem 249.

Media 229 may be provided either stored in embedded memory such as the flash memory 244 (i.e. in a data area 227 of such memory) or a removable memory card such as a Secure Digital™ (SD) card or micro SD™ card, or Compact Flash™ card, or streamed over a network 218.

The media player 270 may take various forms, depending on the type of media 229. For example, in various embodiments, the media player 270 may be a video player, an audio player, an image view, a slideshow player, or any combination thereof. The specific hardware used to reproduce the media 229 depends on the type of the media 229 and the configuration of the device 102 and the type of media it is capable of reproducing. For example, while the device 102 described includes both the display screen 204 for reproduction visual content and the speaker 256 for reproducing audio content, in other embodiments the device 102 may have only one of these media output devices.

The media player 270, document viewer 272, and/or command interpreter 274 may, among other things, be implemented through a stand-alone software application, or combined together in one or more of the operating system 223 and applications 225. In some example embodiments, the functions performed by each of the media player 270, document viewer 272, command interpreter 274 may be realized as a plurality of independent elements, rather than single integrated elements, and any one or more of these elements may be implemented as parts of other software applications 225. Furthermore, in some embodiments, at least some of the functions performed by any one of the media player 270, document viewer 272 and command interpreter 274 may be implemented in firmware of the handheld electronic device 102.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

The software modules 221 may also include a range of other applications not specifically shown in FIG. 4 including, for example, any one or a combination of an address book application, a messaging application, a calendar application, and a notepad application. In some embodiments, the software modules 221 include one or more of a Web browser application (i.e., for a Web-enabled mobile communication device 200), an email message application, a push content viewing application, a voice communication (i.e. telephony) application and a mapping application. The software modules 221 may include layout information defining the placement of particular fields and graphic elements (e.g. text fields, input fields, icons, etc.) in the user interface (i.e. the display screen 204) according to the application.

In some embodiments, the auxiliary input/output (I/O) subsystems 250 may comprise an external communication link or interface; for example, an Ethernet connection. The handheld electronic device 102 may comprise other wireless communication interfaces for communicating with other types of wireless networks; for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the handheld electronic device 102 such as receipt of an electronic communication or incoming phone call, or for other purposes such as haptic feedback.

In some embodiments, the handheld electronic device 102 also includes a removable memory module or card 230 (typically comprising flash memory) and a memory card interface 232. Network access is typically associated with a subscriber or user of the handheld electronic device 102 via the memory card 230, which may be a Subscriber Identity Module (SIM) card for use in a GSM network or other type of memory card for use in the relevant wireless network type. The memory card 230 is inserted in or connected to the memory card interface 232 of the handheld electronic device 102 in order to operate in conjunction with the wireless network 218.

The handheld electronic device 102 stores data 227 in an erasable persistent memory, which in one example embodiment is the flash memory 244. In various embodiments, the data 227 may include service data comprising information required by the handheld electronic device 102 to establish and maintain communication with the wireless network 218. The data 227 may also include user application data such as email messages, address book and contact information, calendar and schedule information, notepad documents, image files, and other commonly stored user information stored on the handheld electronic device 102 by its user, and other data. The data 227 stored in the persistent memory (e.g. flash memory 244) of the handheld electronic device 102 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the handheld electronic device 102 by providing for information or software downloads to the handheld electronic device 102 other than through the wireless network 218. The alternate download path may, for example, be used to load an encryption key onto the handheld electronic device 102 through a direct, reliable and trusted connection to thereby provide secure device communication.

The handheld electronic device 102 may also include a battery 238 as a power source, which may be one or more rechargeable batteries that may be charged, for example, through charging circuitry coupled to a battery interface 236 such as the serial data port 252. The battery 238 provides electrical power to at least some of the electrical circuitry in the handheld electronic device 102, and the battery interface 236 provides a mechanical and electrical connection for the battery 238. The battery interface 236 is coupled to a regulator (not shown) which provides power V+ to the circuitry of the handheld electronic device 102.

The short-range communication subsystem 262 is an additional optional component which provides for communication between the handheld electronic device 102 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices (Bluetooth® is a registered trademark of Bluetooth SIG, Inc.).

A predetermined set of applications that control basic device operations, including data and possibly voice communication applications may be installed on the handheld electronic device 102 during or after manufacture. Additional applications and/or upgrades to the operating system 221 or other software modules 221 may also be loaded onto the handheld electronic device 102 through the wireless network 218, the auxiliary I/O subsystem 250, the serial port 252, the short-range communication subsystem 262, or other suitable subsystem 264 wireless communication interfaces. The downloaded programs or code modules may be permanently installed, for example, written into the program memory (i.e. the flash memory 244), or written into and executed from the RAM 246 for execution by the microprocessor 240 at runtime. Such flexibility in application installation increases the functionality of the handheld electronic device 102 and may provide enhanced on-device functions, communication-related functions, or both. For example, secure communication applications may enable electronic commerce functions and other such financial transactions to be performed using the handheld electronic device 102.

The handheld electronic device 102 may include a personal information manager (PIM) application having the ability to organize and manage data items relating to a user such as, but not limited to, instant messaging, email, calendar events, voice mails, appointments, and task items. The PIM application has the ability to send and receive data items via the wireless network 218. In some example embodiments, PIM data items are seamlessly combined, synchronized, and updated via the wireless network 218, with the user's corresponding data items stored and/or associated with the user's host computer system, thereby creating a mirrored host computer with respect to these data items.

The handheld electronic device 102 may, in at least some embodiments, provide two principal modes of communication: a data communication mode and a voice communication mode. In the data communication mode, a received data signal such as a text message, an email message, or Web page download will be processed by the communication subsystem 211 and input to the microprocessor 240 for further processing. For example, a downloaded Web page may be further processed by a browser application or an email message may be processed by an email message application and output to the display 204. A user of the handheld electronic device 102 may also compose data items, such as email messages, for example, using the input device 206 in conjunction with the display device 204 and possibly the auxiliary I/O device 250. These composed items may be transmitted through the communication subsystem 211 over the wireless network 218.

In the voice communication mode, the handheld electronic device 102 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the handheld electronic device 102. Although voice or audio signal output is typically accomplished primarily through the speaker 256, the display device 204 may also be used to provide an indication of the identity of a calling party, duration of a voice call, or other voice call related information.

While FIG. 4 illustrates an embodiment in which the controller 280 includes a single processor (i.e. microprocessor 240), it will be appreciated that, in other embodiments, the controller 280 will be comprised of a plurality of processors. For example, in at least some embodiments, the controller 280 includes a general-purpose microprocessor which is used for controlling high-level device 201 operations, and also a task-specific microprocessor which is used for performing functions related to a specific task. By way of example, in at least some embodiments, the side sensing subsystem 249 may include its own task-specific microprocessor. The task-specific microprocessor may, in at least some embodiments, be configured to perform any of the processor functions related to the first sensing layer 130 and/or the second sensing layer 140.

Side Sensor Subsystem Command Recognition

Figure 5:
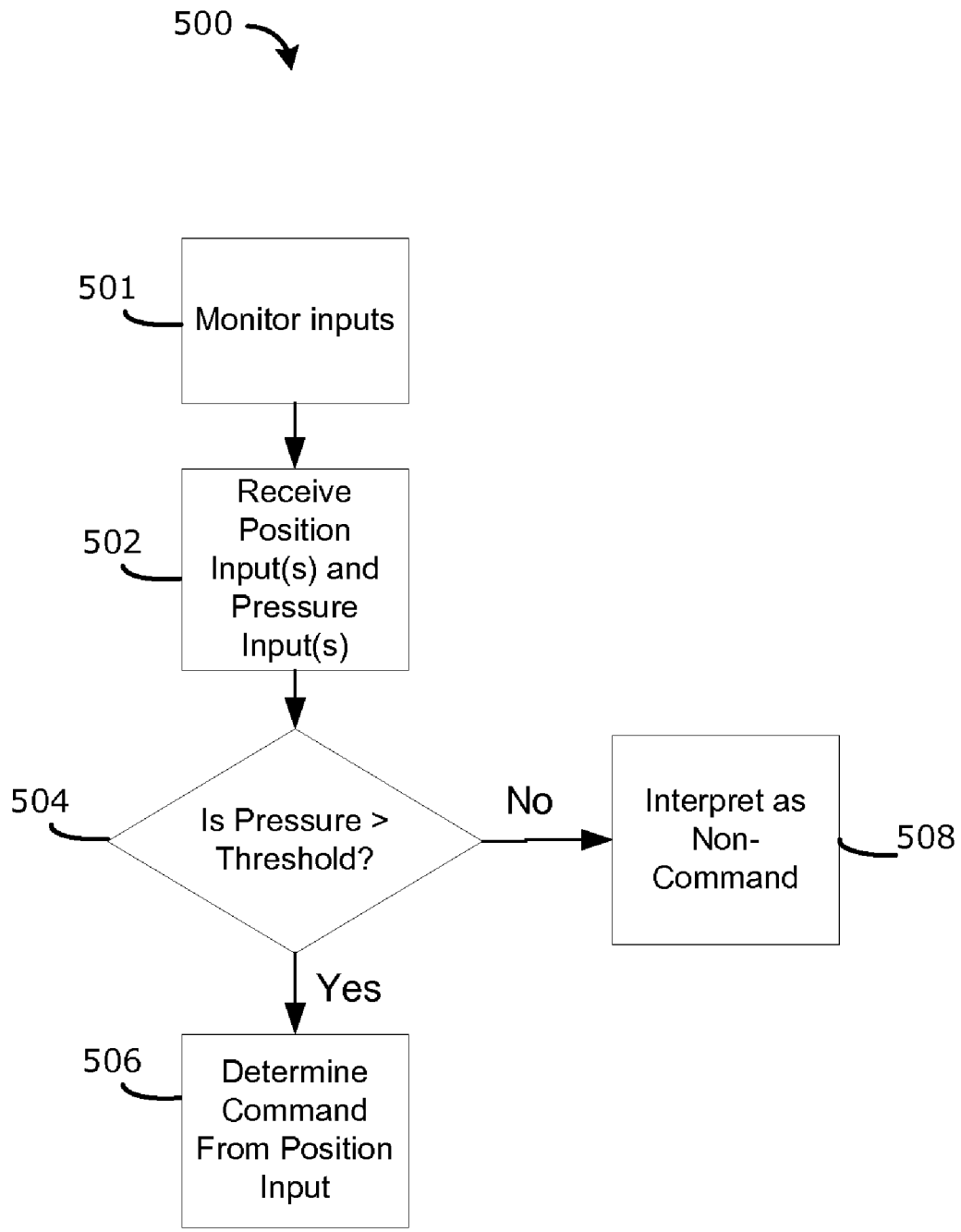
FIG. 5 is a flowchart of a method of interpreting input commands in accordance with an example embodiment of the present disclosure.

Referring now to FIG. 5, an example method 500 for recognizing commands received through the side sensing subsystem 249 is illustrated. The mobile device 102 may be configured to perform the method 500 of FIG. 5. More particularly, the operations of the method 500 are carried out by one or more controller of the device 102 (such as, for example, the microprocessor 240) under the instruction of the command interpreter 274 and/or an application 225. The command interpreter 274 could be a separate module 221, or part of the operating system or application 225. Depending on the embodiment, the command interpreter 274 may pass its result to an active application on the device 102 for further processing. The command interpreter 274 may be limited to selected applications on the device 102 or may be available to all of the applications 225. In some embodiments, the recognition of commands may be enabled or disabled by device settings, application-specific settings or corresponding input to enable or disable the command interpreter 274.

At step 501, the command interpreter 274 monitors the side sensing subsystem 249 for inputs. Inputs may be received at step 502. The received inputs may include a first position input and a first pressure input, which may be received from the first sensing layer 130 (FIG. 4). More particularly, the first position input is received from the first position sensing layer 134 and the first pressure input is received from the first pressure sensing layer 136. The first pressure input identifies an application of pressure along the first side 126 of the device 201. Similarly, the first position input identifies the location of any contact made along the first side 126 of the device 201.

The received inputs may also include a second position input and a second pressure input, which may be received from the second sensing layer 140 (FIG. 4). More particularly, the second position input is received from the second position sensing layer 144 and the second pressure input is received from the second pressure sensing layer 146. The second pressure input identifies an application of pressure along the second side 128 of the device 201. Similarly, the second position input identifies the location of any contact made along the second side 128 of the device 201.

When inputs are received, the command interpreter 274 attempts to determine whether the inputs correspond to any commands, instructions, or functions. For example, in the embodiment illustrated, at step 504, the command interpreter 274 determines whether the pressure corresponding to a pressure input exceeds a threshold. In at least some embodiments, if the pressure exceeds a threshold, at step 506, the command interpreter 274 determines a command that corresponds to the position input received. The command interpreter 274 may make this determination by consulting one or more rules. The one or more rules may map commands to ranges of pressure and/or ranges of position. For example, the rules may specify a command that corresponds to a specific position on the side of the device. When the user engages that specific position, the command interpreter may determine that the user was inputting the specified command.

In at least some embodiments, if the command interpreter 274 determines that the first position sensing layer 134 was engaged at a first location, then it may determine that the input corresponds to a first command. In response to receiving the first command, an active application 225 on the device (or the operating system or command interpreter itself) may cause a first function to be performed. However, if the command interpreter 274 determines that the first position sensing layer 134 was engaged at a second location (which is different from the first location), then it may determine that the input corresponds to a second command (which is different than the first command). In response to receiving the second command, an active application 225 on the device (or the operating system or command interpreter itself) may cause a second function (which is different than the first function) to be performed.

In at least some embodiments, when the device is operating in a media player mode in which a media player 270 is active, the first function may be a PLAY function which causes media to be played on the display of the device. In some embodiments, when the device is operating in the media player mode, the second function may be a STOP function which causes media playback to be stopped.

Thus, the device may be configured to interpret forces applied at different locations to correspond to different virtual buttons which are each associated with different commands. In this manner, any physical push buttons which are commonly placed along the side of such devices may be replaced with virtual buttons.

If, at step 504, the pressure does not exceed the threshold, the command interpreter 274 may determine (step 508) that the command is a non-command (i.e. the user engaged the device in a way that doesn't signal a command).

Figure 6:
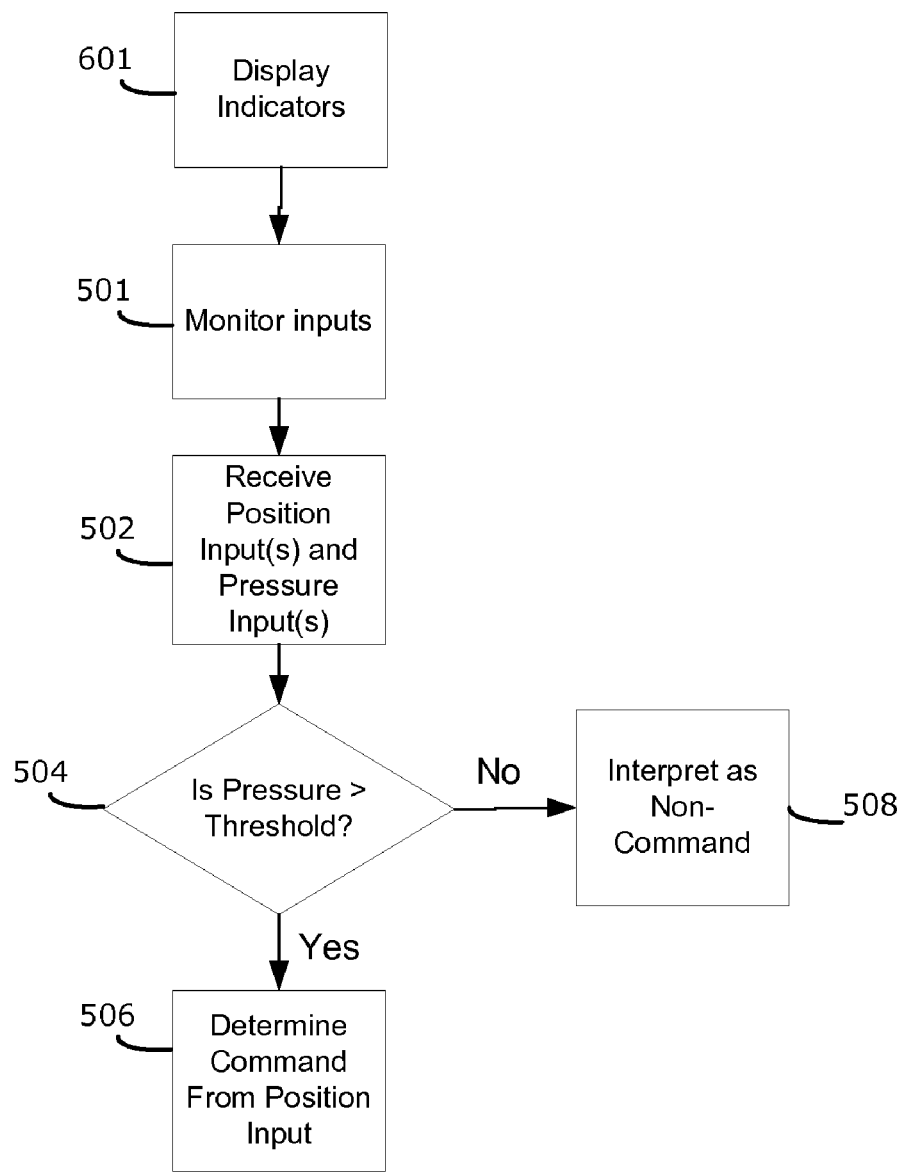
FIG. 6 is a flowchart of a method of interpreting input commands in accordance with an example embodiment of the present disclosure.

In some embodiments, an example of which is illustrated in FIG. 6, indicators may be displayed on the display to identify the command that is associated with each virtual button. That is, the indicators may indicate the specific command which is associated with one or more positions on the first and second sensing layers 130, 140.

The method 600 of FIG. 6 is similar to the method 500 of FIG. 5, except in that it also includes a step 601 of displaying indicators on the display. In at least some embodiments, the step 601 may include a step of displaying, on the display, a first indicator which identifies a first command and/or function. The first indicator is displayed at a location that is adjacent to the location on the first or second sensing layer 130, 140 that is associated with a first function. The step 601 may also include a step of displaying, on the display, a second indicator which identifies a second command and/or function. The second indicator is displayed at a location that is adjacent to the location on the first or second sensing layer 130, 140 that is associated with the second function. By way of example, in the media player embodiment discussed above, "PLAY" may be displayed adjacent to the location on the first or second sensing layer 130, 140 associated with the play command/function. Similarly, "STOP" may be displayed adjacent to the location on the first or second sensing layer 130, 140 associated with the stop command/function.

The mobile device 102 may be configured to perform the method 600 of FIG. 6. More particularly, the operations of the method 600 are carried out by one or more controller of the device 102 (such as, for example, the microprocessor 240) under the instruction of the command interpreter 274 and/or an application 225.

Figure 7:
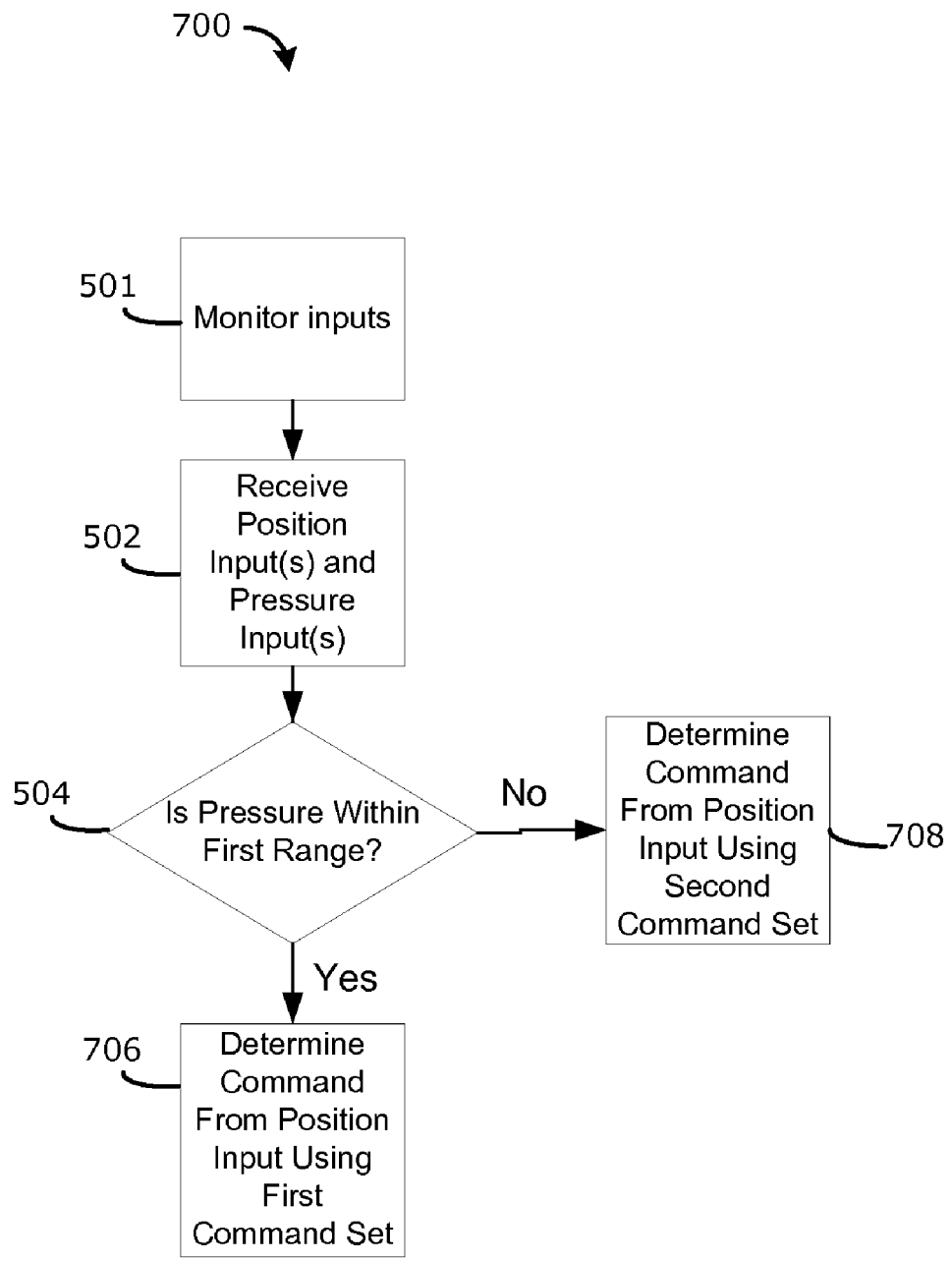
FIG. 7 is a flowchart of a method of interpreting input commands in accordance with an example embodiment of the present disclosure.

In some embodiments, the command interpreter 274 is configured to interpret a relatively hard input (i.e. when the user applies a large amount of force to the side of the device 102) as a separate command than a relatively soft input. Referring now to FIG. 7, one such example method 700 is illustrated. The mobile device 102 may be configured to perform the method 700 of FIG. 7. More particularly, the operations of the method 700 are carried out by one or more controller of the device 102 (such as, for example, the microprocessor 240) under the instruction of the command interpreter 274 and/or an application 225.

At step 501, the command interpreter 274 monitors the side sensing subsystem 249 for inputs. Inputs may be received at step 502. The received inputs may include a first position input and a first pressure input, which may be received from the first sensing layer 130 (FIG. 4). The received inputs may also include a second position input and a second pressure input, which may be received from the second sensing layer 140 (FIG. 4).

When inputs are received, the command interpreter 274 attempts to determine whether the inputs correspond to any commands, instructions, or functions. For example, in the embodiment illustrated, at step 504, the command interpreter 274 determines whether the pressure input is within a first range. In at least some embodiments, the command interpreter 274 does so by determining whether the pressure input is greater than a predetermined threshold. In this embodiment, the first range is defined by pressure inputs in the range of zero to the predetermined threshold, and a second range is defined by pressure inputs in the range of the predetermined threshold to infinity. It will, however, be appreciated that other ranges could be used.

If the pressure input is within the first range, at step 706, the command interpreter 274 determines a command that corresponds to the position input received. The command interpreter 274 may make this determination by consulting a first set of rules. The command interpreter 274 selects the appropriate command from a first command set based on the first set of rules.

If however, the pressure input is not within the first range (for example, if the pressure input is within a second range), at step 708, the command interpreter 274 determines a command that corresponds to the position input received in accordance with a second command set. The command interpreter 274 may make this determination by consulting a second set of rules. The command interpreter 274 selects the appropriate command from a second command set based on the second set of rules.

By way of example, in at least some embodiments, if the pressure input is within the first range, the command interpreter 274 may determine that the command is a command to increase a volume associated with the device 201. The volume is a measure of loudness of playback of audible content through a speaker 256 (FIG. 4) or other audible output device associated with the device 201. If, however, the pressure input is not within the first range (i.e. if it is within a second range), then the command interpreter 274 may determine that the command is a command to decrease a volume associated with the device 201.

While the example illustrated only includes two ranges which each correspond to a separate command set, in other embodiments, more ranges could be used. In such embodiments, each range may correspond to a separate command set. For example, in some embodiments, there may be three ranges (i.e. a relatively hard input, a relatively medium input, and a relatively soft input), each corresponding to a different command set.

Scroll Recognition

Figure 8:
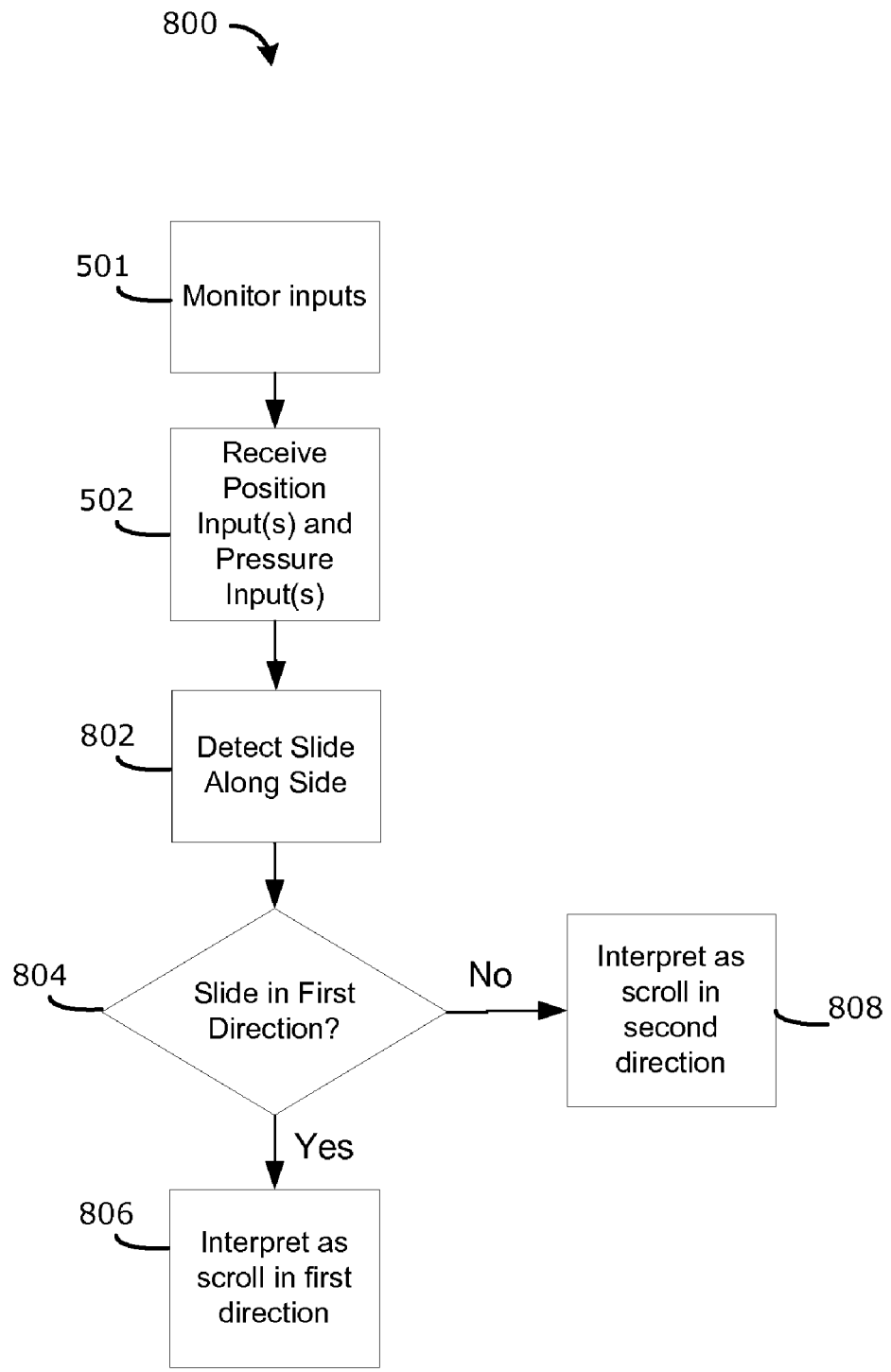
FIG. 8 is a flowchart of a method of interpreting input commands in accordance with an example embodiment of the present disclosure.

In at least some embodiments, when a document viewer 272 (FIG. 4) is active on the device (i.e. the device is in a document viewing mode) the command interpreter 274 is configured to interpret a continual slide of a finger along the side of the device 102 as a scrolling command. One such example embodiment is illustrated in FIG. 8. Referring now to FIG. 8, an example method 800 for recognizing a scroll command received through the side sensing subsystem 249 is illustrated. The mobile device 102 may be configured to perform the method 800 of FIG. 8. More particularly, the operations of the method 800 are carried out by one or more controller of the device 102 (such as, for example, the microprocessor 240) under the instruction of the command interpreter 274 and/or an application 225.

At step 501, the command interpreter 274 monitors the side sensing subsystem 249 for inputs. Inputs may be received at step 502. The received inputs may include a first position input and a first pressure input, which may be received from the first sensing layer 130 (FIG. 4). The received inputs may also include a second position input and a second pressure input, which may be received from the second sensing layer 140 (FIG. 4).

Next, at step 802, the command interpreter 274 determines from the position input, whether a finger has been slid across one of the sides of the device 102. This determination may be made by determining whether adjacent locations were successively engaged on a sensing strip. If the command interpreter 274 determines that a finger was slid across the side of the device, then it may also determine that a scrolling command has been received.

If a scrolling command is received, the command interpreter 274 may determine whether the finger was slid across the side of the device 102 in a first direction or whether it was slid across the side of the device 102 in a second direction (step 804). The direction of sliding may be determined in accordance with the position input.

If the finger was slid across the side of the device 102 in a first direction, then at step 806, the command interpreter may interpret the action as a command to scroll a document in a first direction. If, however, the finger was slid across the side of the device 102 in the second direction, then at step 808, the command interpreter may interpret the action as a command to scroll a document in a second direction. If the command is interpreted as a command to scroll the document in a first direction, then the command interpreter 274 and/or a document viewer 272 may cause the document to be scrolled in the first direction. If the command is interpreted as a command to scroll the document in a second direction, then the command interpreter 274 and/or document viewer 272 may cause the document to be scrolled in the second direction.

Detect Squeeze

In at least some embodiments, the command interpreter 274 is configured to determine whether the device has been squeezed and, if so, to execute a predetermined function corresponding to a squeeze command.

A squeeze may occur where the first pressure sensing layer 136 associated with the first side 126 of the device 102 and the second pressure sensing layer 146 associated with the second side 128 of the device 102 are simultaneously activated.

Figure 9:
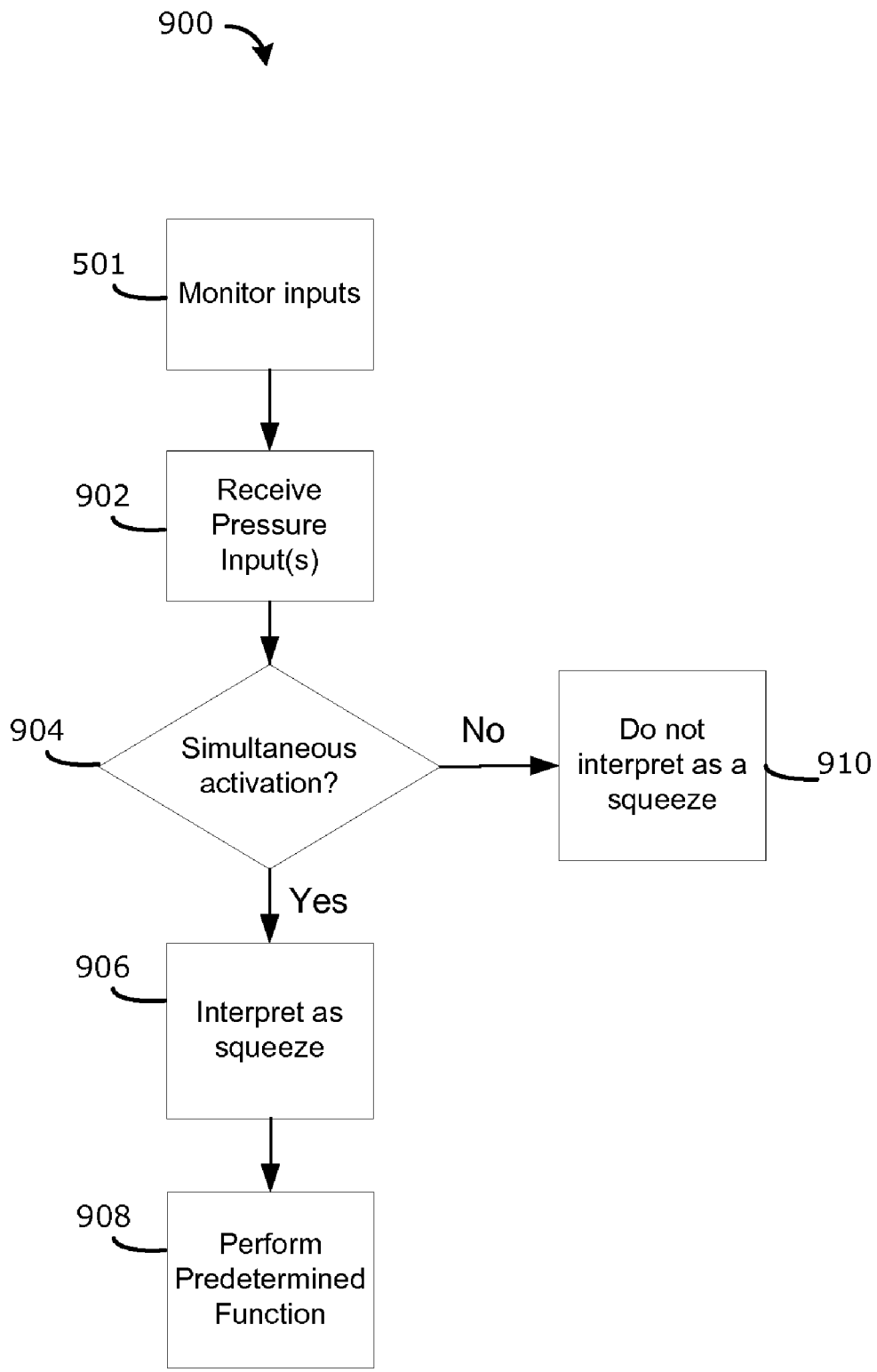
FIG. 9 is a flowchart of a method of interpreting input commands in accordance with an example embodiment of the present disclosure.

Referring now to FIG. 9, one such embodiment is illustrated. An example method 900 for recognizing a squeeze command received through the side sensing subsystem 249 is illustrated. The mobile device 102 may be configured to perform the method 900 of FIG. 9. More particularly, the operations of the method 900 are carried out by one or more controller of the device 102 (such as, for example, the microprocessor 240) under the instruction of the command interpreter 274 and/or an application 225.

At step 501, the command interpreter 274 monitors the side sensing subsystem 249 for inputs. Inputs may be received at step 902. The received inputs include a first pressure input and a second pressure input and may also include a first position input and a second position input. The inputs are received from the first sensing layer 130 and the second sensing layer 140.

Next, at step 904, the command interpreter 274 determines from the pressure inputs, whether the device was squeezed. It does so by determining whether the first pressure sensing layer 130 and the second pressure sensing layer 140 were simultaneously engaged. If they were simultaneously engaged, then at step 906, the command interpreter interprets the input as a squeeze command.

At step 908, in response to receiving a squeeze command, the command interpreter 274 or another application 225 performs a predetermined action.

In at least some embodiments, if, at the time of the squeeze, the device has an unanswered voice telephone call, then the squeeze command causes the telephone call to be answered.

If, however, the command interpreter determines that the first pressure sensing layer 130 and the second pressure sensing layer 140 were not simultaneously activated, then at step 910, it does not interpret the input as a squeeze.

While the example embodiment discussed herein describes an embodiment in which the first position sensing layer 130 is located along the left side of the device and the second position sensing layer 140 is located along the right side of the device 201, in other embodiments, the first position sensing layer 130 and/or the second position sensing layer 140 may be located at other sides of the device 201. For example, in at least some embodiments, the first position sensing layer 130 may be located along a top side of the device 201 and the second position sensing layer 140 may be located along a bottom side of the device.

Furthermore, in at least some embodiments, the device 201 may be equipped with additional sensing layers, such as, for example, a third sensing layer which may be located along a third side of the device 201. In at least some embodiments, the device 201 may also include a fourth sensing layer located along a fourth side of the device 201.

In accordance with further embodiments of the present disclosure, there are provided a computer program product comprising a computer readable medium having stored thereon computer executable instructions comprising instructions for practising the methods of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

While the present disclosure is primarily described as a method, a person of ordinary skill in the art will understand that the present disclosure is also directed to various apparatus such as a mobile wireless device for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

FIGS. 5-9 are flowcharts of example embodiment methods. Some of the steps illustrated in the flowchart may be performed in an order other than that which is described. Also, it should be appreciated that not all of the steps described in the flow chart are required to be performed, that additional steps may be added, and that some of the illustrated steps may be substituted with other steps.

The invention claimed is:

1. A mobile device comprising:
    a housing, the housing having a front face exposing a display, a back face opposing the front face, a plurality of sides connecting the back face to the front face, the plurality of sides including at least a first side and a second side, the first side and the second side each having an internal surface facing toward an interior of the housing and the first side and second side each having an external surface opposing the internal surface, the external surface being level across the length of the housing;
    a controller located within the housing; and
    a first sensing layer located within the interior of the housing adjacent the internal surface of the first side, the first sensing layer including:
        a first position sensing layer extending longitudinally adjacent the internal surface of the first side and being coupled to the controller to provide position input to the controller; and
        a first pressure sensing layer being coupled to the controller to provide pressure input to the controller,
    the first side being configured for movement between a rest position and an actuating position when pressure is applied to the external surface of the first side, the first side applying greater force to the first pressure sensing layer in the actuating position than in the rest position.

2. The mobile device of claim 1, wherein the first side is constructed of a semi-rigid material which permits the first side to bend when pressure is applied to the first side in order to enter the actuating position.

3. The mobile device of claim 2, wherein the first side is comprised of a semi-rigid plastic.

4. The mobile device of claim 1, wherein the position input identifies a location of any portion of the first sensing layer engaged by direct or indirect contact.

5. The mobile device of claim 1, wherein the first position sensing layer is a capacitive sensor or a resistive sensor.

6. The mobile device of claim 1, wherein the first position sensing layer extends along at least half of the first side.

7. The mobile device of claim 1, wherein the first position sensing layer is located between the first side and the first pressure sensing layer.

8. The mobile device of claim 1, wherein the first pressure sensing layer comprises: a point pressure sensor and an elongate pressure distribution strip disposed between the point pressure sensor and the first side.

9. The mobile device of claim 1, further comprising:
a second sensing layer located within the interior of the housing adjacent the internal surface of the second side, the second sensing layer including:
a second position sensing layer extending longitudinally adjacent the internal surface of the second side and being coupled to the controller to provide position input to the controller; and
a second pressure sensing layer being coupled to the controller to provide pressure input to the controller,
the second side being configured for movement between a rest position and an actuating position when pressure is applied to the external surface of the second side, the second side applying greater force to the second pressure sensing layer in the actuating position than in the rest position.

10. The mobile device of claim 9, wherein the controller is configured to:
monitor pressure input received from the first pressure sensing layer and the second pressure sensing layer;
determine, from the pressure input, whether both of the pressure sensing layers are simultaneously activated; and
in response to determining that both pressure sensing layers are simultaneously activated, performing a predetermined action.

11. The mobile device of claim 10, wherein the controller is further configured to:
determine whether an unanswered telephone call has been received at the mobile device; and
in response to determining that both pressure sensors are simultaneously activated while an unanswered telephone call has been received at the mobile device: cause the telephone call to be answered.

12. The mobile device of claim 1, wherein the controller is further configured to:
determine whether the pressure input is within a first range;
determine whether the pressure input is within a second range;
perform a first predetermined action if the pressure input is within the first range; and
perform a second predetermined action if the pressure input is within the second range.

13. The mobile device of claim 1, wherein the controller is further configured to:
in a document viewing mode, determine, from the position input, whether a finger has been slid along the first side, and if so, cause the document to be scrolled.

14. The mobile device of claim 13, wherein the controller is further configured to:
determine, from the position input, whether the finger has been slid along the first side in a first direction and, if so, cause the document to be scrolled in the first direction; and
determine, from the position input, whether the finger has been slid along the first side in a second direction and, if so, cause the document to be scrolled in the second direction.

15. The mobile device of claim 1, wherein the controller is further configured to:
determine from the position input whether the first position sensing layer is engaged at a first location, and if so, perform a first function;
determine from the position input whether the first position sensing layer is engaged at a second location, and if so, perform a second function.

16. The mobile device of claim 15, wherein, when the controller is operating in a media control mode, the first function is a PLAY function which causes media to be played on the display and the second function is a STOP function which causes media playback on the display to be stopped.

17. The mobile device of claim 16, wherein the controller is further configured to:
display, on the display, at a location adjacent to the first location, a first indicator which identifies the first function; and
display, on the display, at a location adjacent to the second location, a second indicator which identifies the second function.

* * * * *